United States Patent
Lapelosa

(10) Patent No.: US 12,053,732 B2
(45) Date of Patent: Aug. 6, 2024

(54) MODULAR FILTER FOR VENTILATION AIR VENTS

(71) Applicant: NITTY-GRITTY SRL, Sassuolo (IT)

(72) Inventor: Michele Lapelosa, Sassuolo (IT)

( * ) Notice: Subject to any disclaimer, the term of this patent is extended or adjusted under 35 U.S.C. 154(b) by 623 days.

(21) Appl. No.: 17/289,099

(22) PCT Filed: Nov. 2, 2019

(86) PCT No.: PCT/IT2019/050234
§ 371 (c)(1),
(2) Date: Apr. 27, 2021

(87) PCT Pub. No.: WO2020/089955
PCT Pub. Date: May 7, 2020

(65) Prior Publication Data
US 2022/0008857 A1      Jan. 13, 2022

(30) Foreign Application Priority Data

Nov. 2, 2018   (IT) .................. 102018000010016

(51) Int. Cl.
*B01D 46/18*        (2006.01)
*B01D 46/00*        (2022.01)
(Continued)

(52) U.S. Cl.
CPC ....... *B01D 46/185* (2013.01); *B01D 46/0002* (2013.01); *B01D 46/18* (2013.01);
(Continued)

(58) Field of Classification Search
None
See application file for complete search history.

(56) References Cited

FOREIGN PATENT DOCUMENTS

| GB | 1229095 A | 4/1971 |
| JP | 3186179 U | * 9/2013 |

OTHER PUBLICATIONS (Espacenet machine translation of Hashimoto) (Year: 2013).*
JP3186179U_Eng (Espacenet machine translation of Hashimoto) (Year: 2013).*

* cited by examiner

*Primary Examiner* — Gabriel E Gitman
(74) *Attorney, Agent, or Firm* — Patshegen IP; Moshe Pinchas

(57) ABSTRACT

A modular filter for ventilation air vents comprises a filtering fabric roll (1) housed within a casing provided with anchoring means (13) engaging the surface (S) of the container which has the air intake port (B) to be filtered; the casing has a slot (9) for extracting the filtering fabric (T), and has a casing (4) comprised of a shaped wall (5) enclosed at the ends by covers (10, 40, 44, 51) or end supports (7, 47) of this wall having a shape corresponding to the shaped wall (5) and maintaining a longitudinal slot (9) at the front edges of the shaped wall to allow the passage for the extraction of the front (F) of the filtering fabric (T) unwound from the filtering fabric roll (1); at least one screw stay rod (8, 54) is placed between two covers (51) or end supports (7, 47) of the shaped wall and is tightened to define the proper distance between the two end supports or covers (51), by tightening the end supports (7, 47) or covers (51) to the shaped wall (5), one at each end, to close the access to the casing, and containing the filtering fabric roll (1) floating and free to rotate when the filtering fabric is dragged from the outside of the modular filter.
Various methods for producing the shaped wall (5) and finalizing the casing (4) of the modular filter are indicated.

15 Claims, 17 Drawing Sheets

(51) Int. Cl.
  *B01D 46/64* (2022.01)
  *B65D 85/672* (2006.01)
  *B65H 16/00* (2006.01)
  *B65H 16/06* (2006.01)
(52) U.S. Cl.
  CPC .......... *B01D 46/64* *(2022.01); B01D 2279/35 (2013.01); B65D 85/672 (2013.01); B65H 16/005 (2013.01); B65H 16/06 (2013.01); B65H 2402/443 (2013.01)*

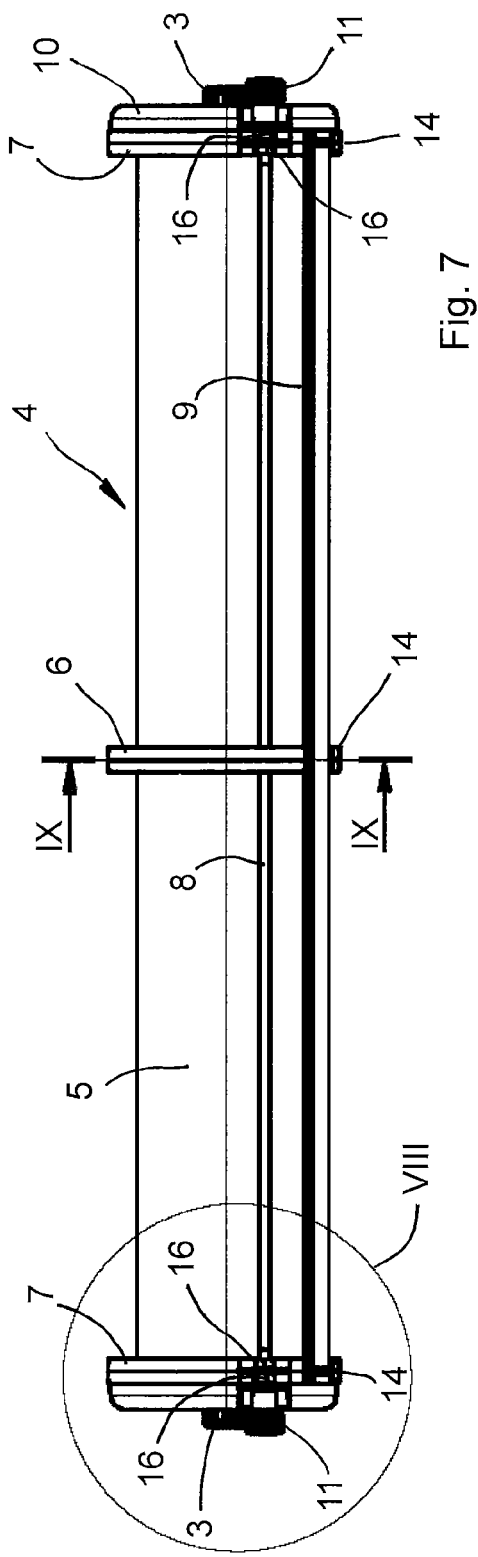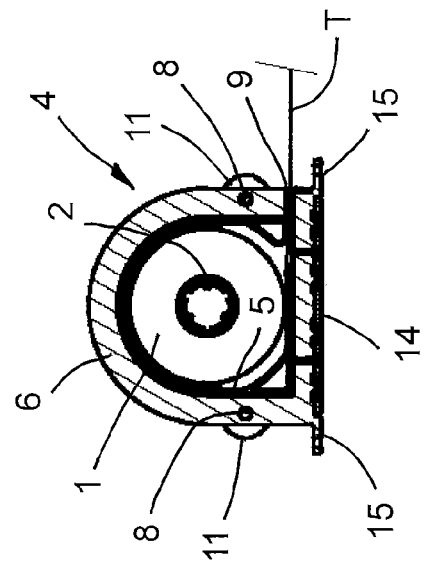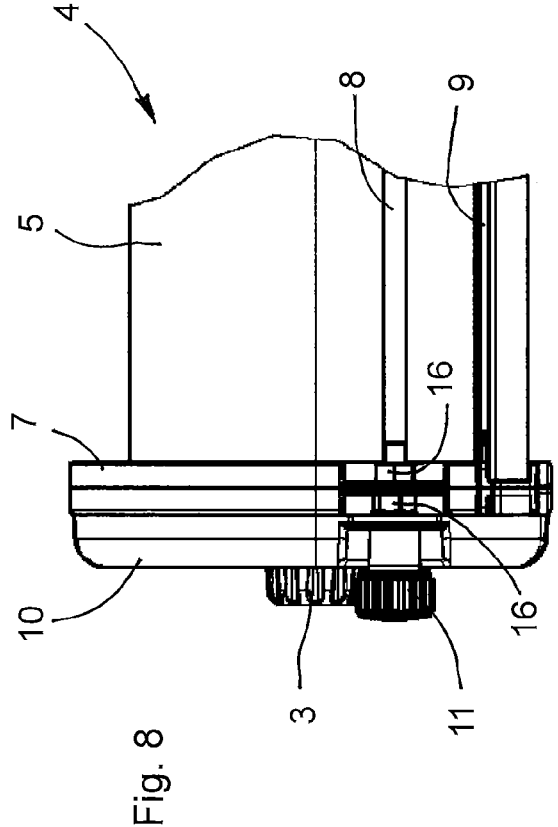

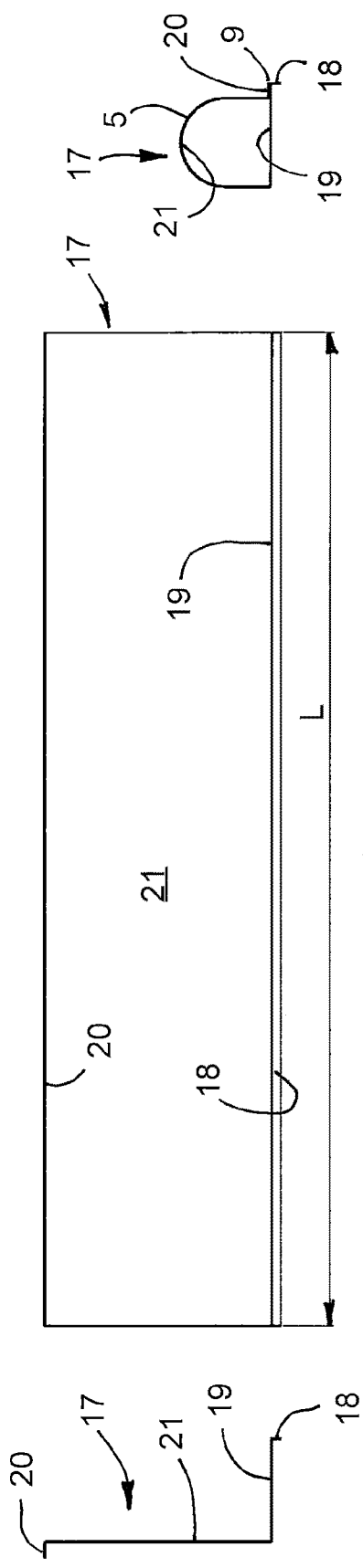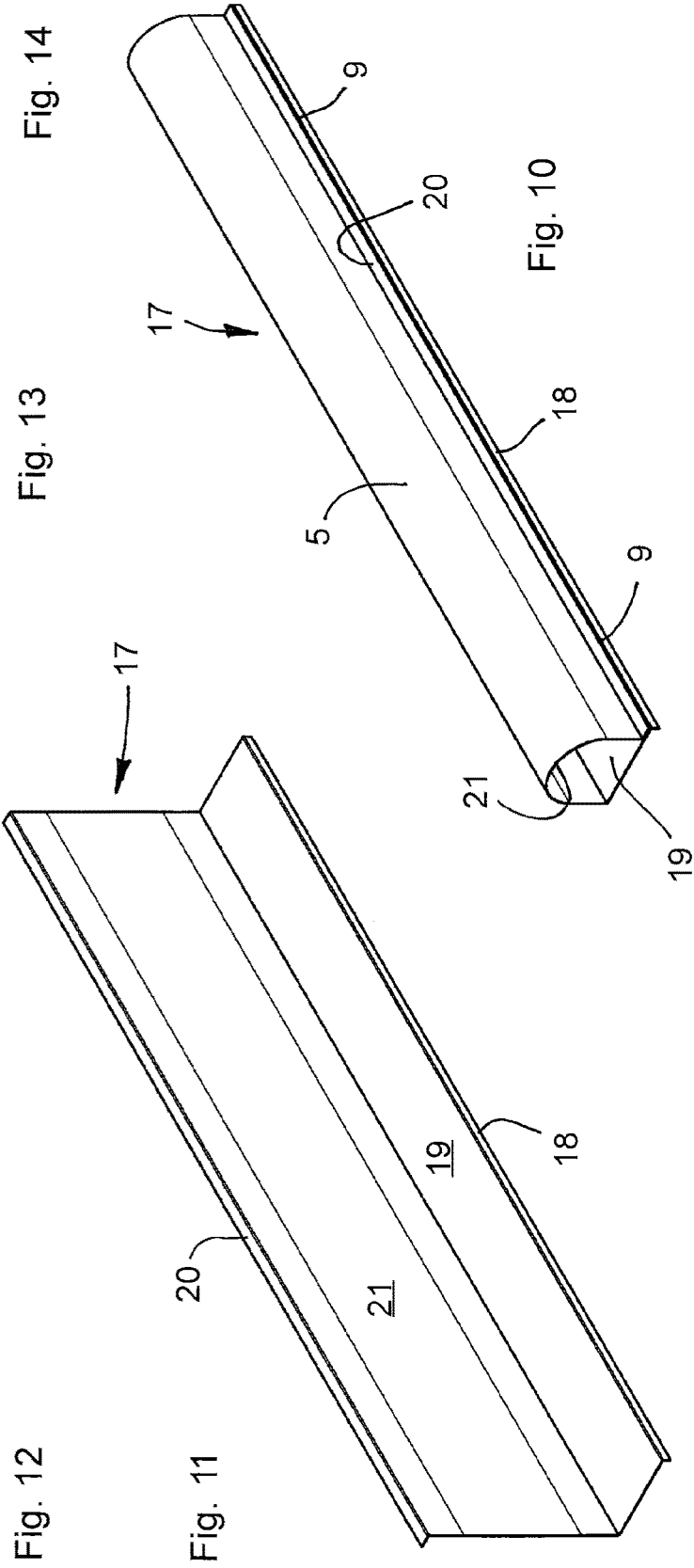

MODULAR FILTER FOR VENTILATION AIR VENTS

FIELD OF APPLICATION

The present invention relates to a modular filter for ventilation air vents, i.e., to the conformation of a casing and filter support, generally a filtering fabric wound up in a roll and unwound to be used on the air vent, which can be formed easily in the size required for the use. This filter is notoriously used in the intake ports of electric panels, electronic equipment and similar containers where it is necessary to remove atmospheric dust from the incoming cooling air.

BACKGROUND ART

The background art includes filters for ventilation air vents in which a filtering fabric roll is housed within a parallelepiped casing having a square base and sized to contain the wound filtering fabric roll. The filtering fabric is unwound from the casing placed near the air vent and covers the vent itself for filtering the cooling air of the equipment to be filtered. By the way, these casings and roll filters are used in the maximum width of the front of the filtering fabric of the roll, required to cover the air vent, and are provided with means for attaching to the container surface of the relevant apparatus.

The filtering fabric roll is used by positioning the casing near the intake port, making it adhere to the surface of the container with the intake port and by positioning the end of the roll filtering fabric, when extracted from a dedicated slot in the casing, to completely cover the said intake port, also by attaching the ends of the filtering fabric to the said surface of the container. It is known the use of permanent magnets to apply the casing with the filtering fabric and the ends of the filtering fabric covering the air vent onto the container of the apparatus or appliance involved in the application.

Therefore, the said casings with the filtering fabric wound up in a roll formed with small to large size, yet still with casings of a specific size, which is made industrially and based on the size of the front of the roll intended for use, are known in the prior art.

A strong manufacturing constraint of these casings is represented by the thermoforming of the sheet material, generally made of plastic, which is cut and bent to form the casing. That is, due to size restrictions that thermoforming machines have, the material cannot be shaped to form casings with the front of the roll filtering fabric exceeding 600 millimetres. Furthermore, providing this casing allows a maximum diameter of the filtering fabric roll of about 60 millimetres, which limits the length of the roll filtering fabric based on the thickness that the filtering fabric has. With the minimum thickness, e.g., of 0.2 mm, the length of the fabric can also be 12 meters, while with a high thickness, e.g., of 1 mm, the length of the filtering fabric wound up in the roll fitted in the casing significantly decreases.

An example of this technology is the earlier document U.S. Pat. No. 4,627,683, wherein for an air treatment apparatus, having a passage for the air flow and a supporting framework with said passage, a filter in the form of a continuous tape wound up in a roll around a cylindrical core and housed within a chamber applied to the apparatus is disclosed; said chamber for housing the roll filter is mounted on said supporting framework; a discharge slit from the chamber having a width equal to the passage and means for mounting said filtering fabric roll and allowing the feeding of the belt on said passage. Said means for mounting the filtering fabric roll into said chamber including a pair of articulated shafts aligned and fixedly mounted, when in position at the ends of said chamber, against the rotation and axial displacement in said chamber and spaced apart from one another by a length shorter than the core being inserted into the hollow ends of said core; the core material and the shafts in the coupling form frictional surfaces so as to generate a friction resistance that allows the controlled rotation of the roll when the tape is fed through the slit by manual picking.

In fact, the described chamber functions as a support for the cylindrical core of the filtering fabric roll and needs to be made with a specific linear size parallel to the axis of the coupling shafts to the cylindrical core, i.e., the sizes of the chamber and of the filtering fabric roll are related, just as the component parts which require a specific formation of the end surfaces of the chamber on which the two articulated shafts are attached. In addition, upon each replacement of the filtering fabric roll, it is necessary to completely open the chamber on the longitudinal walls with respect to the cylindrical core of the filtering fabric before being able to extract and replace the exhausted filtering fabric roll by removing the cylindrical core from each of the two articulated shafts.

Hence, such a construction is impractical and results in significant manufacturing costs when aimed at achieving a specific size in width of the tape of filtering fabric to be used, also in relation to the required thickness of the filtering fabric, since it has to be custom made, not mass-produced.

In the art, it is known in the field to apply said roll filters on the port taking in cooling air and, upon fulfilling the intended use of the filtering fabric, highlighted by the blackening thereof by atmospheric dust, to extract other uncontaminated filtering fabric from the casing and to remove from the roll the filtering fabric already used, thus restoring the filtration capacity on the air taken in by the port.

In fact, a further drawback of the solution described above, with fixed-size casings formed during manufacturing, relates to the lack of versatility of the manufacturing of casings for roll filtering fabrics having a specific longitudinal size of the front of the roll, so as to cover exactly a width of the air intake port accurately. That is, casings with roll filtering fabric of a specific size can be either narrow, to properly cover an air intake port, or too wide, thus wasting the filtering fabric exceeding the width of the port taking in air involved in filtration, or even with hindrance to installation due to the overall dimensions of the container against the machine where the air intake port is located. Alternatively, the casing may contain a filtering fabric roll having a length suitable for the intended use, even if the filtering fabric has a large thickness.

Power-operated embodiments of roll filter assembly structures which are gradually extracted in use are also known. An embodiment of a power-operated filter is extensively disclosed in the prior document US 2010/077923 A1 of an incoming air filtering system to be mounted inside the air inlet duct in a duct of a conditioning system. It has a supply feeder for storing a new clean filtering fabric roll, wound around an empty feeding mandrel, a storage feeder with an empty mandrel for storing the contaminated filtering fabric, which comprises a pair of fixed feeding mandrels each attached to the opposite ends of the supply feeder, each of said feeding mandrels being intended to be housed within a respective end of the hollow feeding mandrel, said feeding mandrels having each slightly larger diameters than the diameter of the associated feeding mandrel, to generate a friction force for extracting the filtering fabric tape from the clean filtering fabric roll; a pair of selectively rotatable winding mandrels, each mounted so as to rotate at opposite ends of the storage area and rotate the hollow storage mandrel, wherein said frictional force generated by said feeding mandrels with the feeding mandrel is suitable for preventing the formation of unwanted ripples or the loosening in the filtering fabric.

In fact, a support box is placed between the storing and the feeding mandrels of the filtering fabric; said box has a curved surface at the feeding mandrel having a radius of curvature slightly greater than the rolling radius of the uncontaminated filtering fabric; it has also a curved surface adjacent to the storing mandrel having a radius of curvature at least slightly greater than the rolling radius of the contaminated filtering fabric. With the aforesaid conformation, it is clear that each filtering fabric roll, whether uncontaminated and ready for air filtration or contaminated and collected in the storage mandrel, is provided with filtering fabric winding (storage) or unwinding (feeding) cylindrical shafts or cores which are frictionally inserted in said mandrels and thus form shafts for the rotation of the respective rolls. In fact, the support of the said shafts is embodied by typical turning pair of the type support/mandrel, so as to allow the rotation always in the same point and to provide the transmission of the rotation movement for the storage shaft. That is, such a construction requires a specific sizing, and therefore a construction to size for the variation in the width of the filtering fabric forming the wound roll filter. This construction does not allow an embodiment with a desired modularity in the cost-efficient production of different sizes of the width of the filter, i.e., of the casing containing it. In fact, the arrangement of the housing parts of the positioning mandrels of the filtering fabric roll, spaced apart from the respective curved walls, requires an accurate and repeated construction achievable only with production in printed plastic or metal material.

Such background art is susceptible of considerable improvements with regard to the possibility of producing a modular filter for ventilation air vents, which overcomes the aforementioned drawbacks of the prior art.

The technical problem underlying the present invention is, therefore, to provide a modular filter for ventilation air vents which also makes it possible to construct extemporarily casings made of a roll filtering fabric, with a specific size of the front of the roll, which can be standardized or specifically made according a size requested by the user.

An object inherent to the preceding technical problem is to provide a modular conformation of the casing of the roll filtering fabric which allows the simple, easy and quick production of a casing with the front of the roll being standardized or made specifically according to the user's request.

A further and not least object of the present invention is to provide a modular conformation of the casing for the roll filtering fabric which is affordable to produce, i.e., with a limited number of parts involved in modularity and, therefore, to achieve a reduction or significant limitation of materials composing the casings available in stock for the manufacturer even if he produces filters with front of the roll according to the user's request.

SUMMARY OF THE INVENTION

This problem is solved, according to the present invention, by a modular filter for ventilation air vents comprising: a filtering fabric roll housed within a casing provided with anchoring means engaging the surface of the container which has the air intake port to be filtered; the casing has a slot for extracting the filtering fabric; characterised in that it has a casing composed of a shaped wall enclosed at the ends by covers or end supports of this wall having a shape corresponding to the shaped wall and maintaining a longitudinal slot at the front edges of the shaped wall to allow the passage for the extraction of the front of the filtering fabric unwound from the filtering fabric roll; at least one screw stay rod is placed between two covers or end supports of the shaped wall and is tightened to define the proper distance between the two end supports or covers, by tightening the end supports or covers to the shaped wall, one at each end, to close the access to the casing, and containing the filtering fabric roll floating and free to rotate when the filtering fabric is dragged from the outside of the modular filter.

In a further constructive form: the stay rod is replaced by at least one pair of stay rods with the filtering fabric roll contained in the casing consisting of the shaped wall and the two covers or two end supports of this wall being interposed.

Furthermore, in an improved constructive form: the shaped wall is arch-shaped to include the outer diameter of the filtering fabric roll.

Further, in a specific and preferred embodiment: at least one intermediate support housed between the two end supports is provided to contain the casing.

In a constructive variant: at least one pair of intermediate supports of this shaped wall, housed on said intermediate supports and closed by two covers with a central stay rod in the closing wall of the covers, is provided to contain the casing.

Furthermore, in a further variant of the constructive form, a single end support is coupled to an end cover which can be removed separately from the end support at least on one side to access the filtering fabric roll and to replace it.

Furthermore, in a specific improved embodiment: the shaped wall is embodied by a sheet made of a plastic material and previously bent along its length with a ledge provided with an end edge of the ledge, and a wall with the end edge of the wall being folded elastically during assembly to take the shape required for the insertion in the end supports.

Furthermore, in a further advantageous constructive form, the filtering fabric roll has at least one pin inserted in a core of the roll protruding from the respective end cover for the manual handling of the filtering fabric roll itself.

Finally, a further constructive variant comprises at least one knob inserted at the end of the stay rod to allow the attachment or detachment of the end support and/or cover located at the end of the casing.

Further features and the advantages of the present invention, in providing a modular filter for ventilation air vents, will be manifest by the following description of different constructive forms and embodiments, provided by way of non-limiting example, with reference to the seventeen attached drawing tables.

BRIEF DESCRIPTION OF THE DRAWINGS

FIG. 7 illustrates a schematic front view of a casing for roll filtering fabric of the preceding figures, herein mounted and before use;

FIG. 8 illustrates a schematic and enlarged view of the end VIII of the casing in FIG. 7 to show the mounting of the stay rods on the end supports;

FIG. 9 illustrates a schematic view of section IX-IX on an intermediate support of the casing for the filtering fabric roll in FIG. 7;

FIG. 10 illustrates a schematic perspective view of the shaped wall composing the casing for the filtering fabric roll according to the invention;

FIG. 11 illustrates a schematic perspective view of the shaped wall of the casing in FIG. 10, herein before the arch bending;

FIG. 12 illustrates a schematic side view of the shaped wall of the casing in FIG. 11;

FIG. 13 illustrates a schematic front view of the shaped wall of the casing in FIG. 11;

FIG. 14 illustrates a schematic side view of the shaped wall of the casing in FIG. 11, after bending, i.e., as bent into an arch as depicted in FIG. 10;

DETAILED DESCRIPTION OF THE PREFERRED CONSTRUCTIVE FORM

Figure 1:
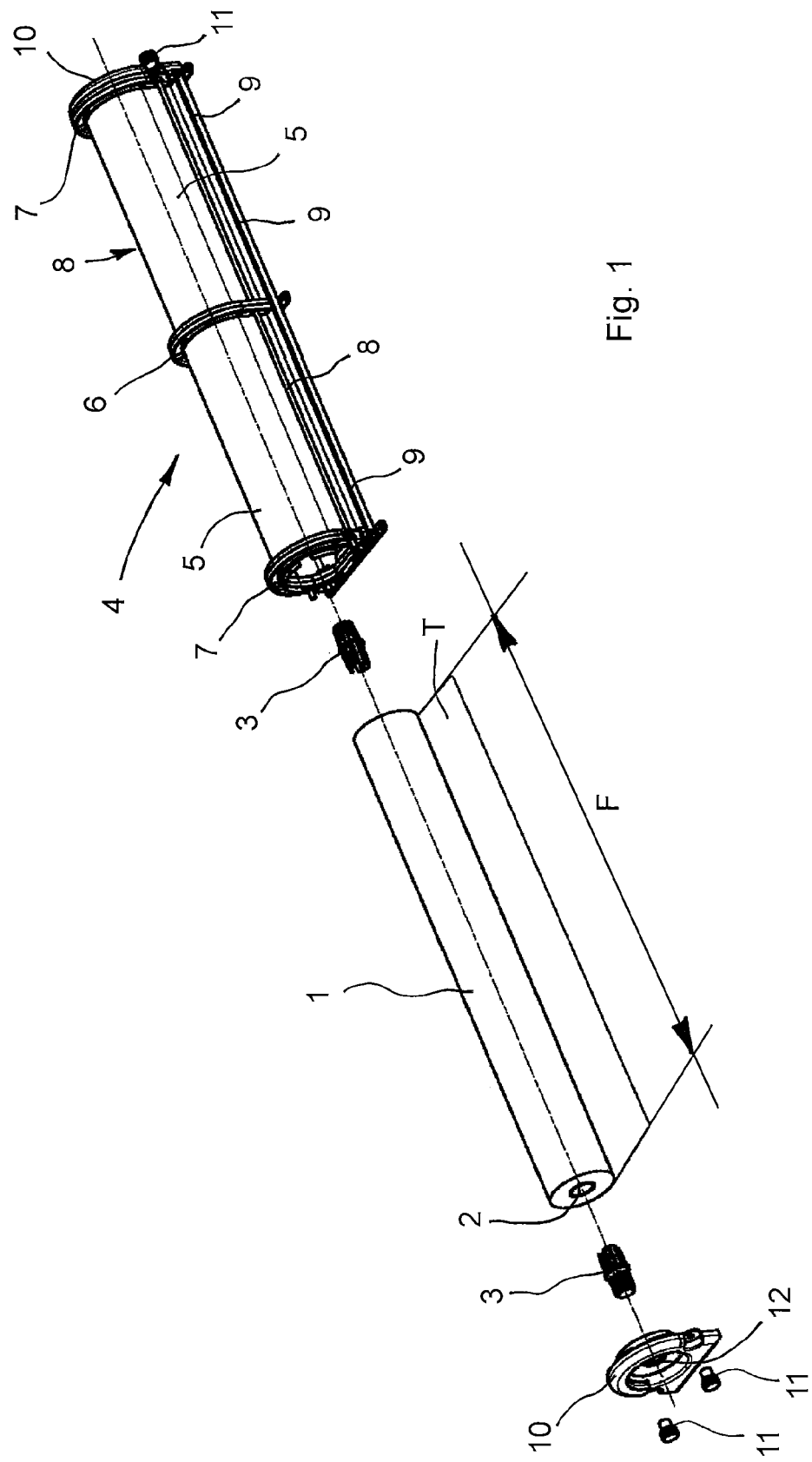
FIG. 1 illustrates a schematic perspective view of a modular filter for air intake ports decomposed into its components; the filtering fabric roll, the supporting pins within the casing, and the cover at the end of the casing open to show the time of replacement of the filtering fabric roll within the support which is usually applied to the container of the apparatus or machine on which it is employed.

FIG. 1 shows a roll 1 of filtering fabric T comprising a tubular core 2 onto which the pins 3 are inserted at each end thereof; the filtering fabric has a front F in length, for covering an air intake port B; the casing 4 has a shaped wall 5 folded into an arch with a length slightly greater than F; an intermediate support 6 keeps the shaped wall bent into an arch; two end supports 7 delimit the length of the shaped wall 5 and, like the intermediate support, hold the shaped wall at its ends; two stay rods 8 are arranged to tighten the two end supports and the shaped wall, bent into an arch, one to another to contain the roll 1 of filtering fabric T. The end supports 7, the intermediate support 6 and the shaped wall 5 have a slot 9 which is longitudinal and parallel to the front F of the filtering fabric roll 1 when mounted; an end cover 10 is placed on each end support 7 to close the casing 4 by tightening the knobs 11 at the ends of the said stay rods 8; each cover 10 has a hole 12 for housing a respective pin 3 and manually actuating it from the outside of the casing 4 when mounted.

Figure 4:
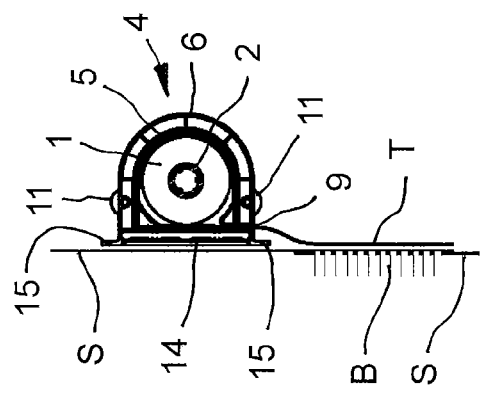
FIG. 4 illustrates a schematic view of section IV-IV of the casing for the filtering fabric roll in FIG. 3.
Figure 3:
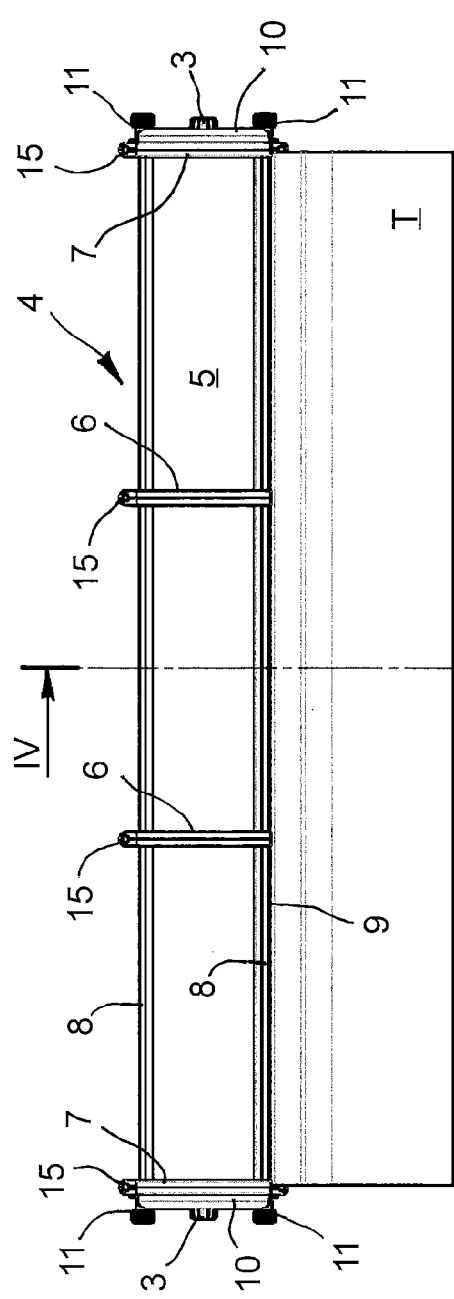
FIG. 3 illustrates a schematic plan view of the casing with the filtering fabric roll in FIG. 2.
Figure 2:
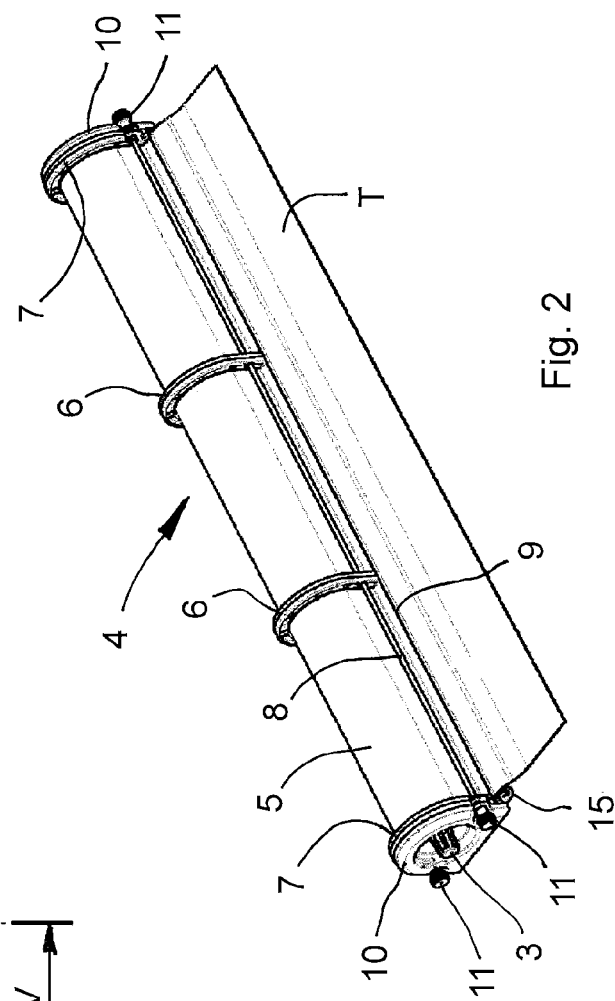
FIG. 2 illustrates a schematic perspective view of a casing with the roll filtering fabric herein ready for use.

FIGS. 2 to 4 show the mounted modular filter and how it is applied to the surface S of the container where the cooling air intake port B of the container itself is provided. The intermediate and end supports have anchoring means 13 comprising permanent magnets, housed in the base 14 of each intermediate/end support, and flaps 15 for the possible attachment with the typical screws. The filtering fabric T is approached, FIG. 4, to cover the intake port and is usually attached with movable permanent magnets not depicted herein.

Figure 5:
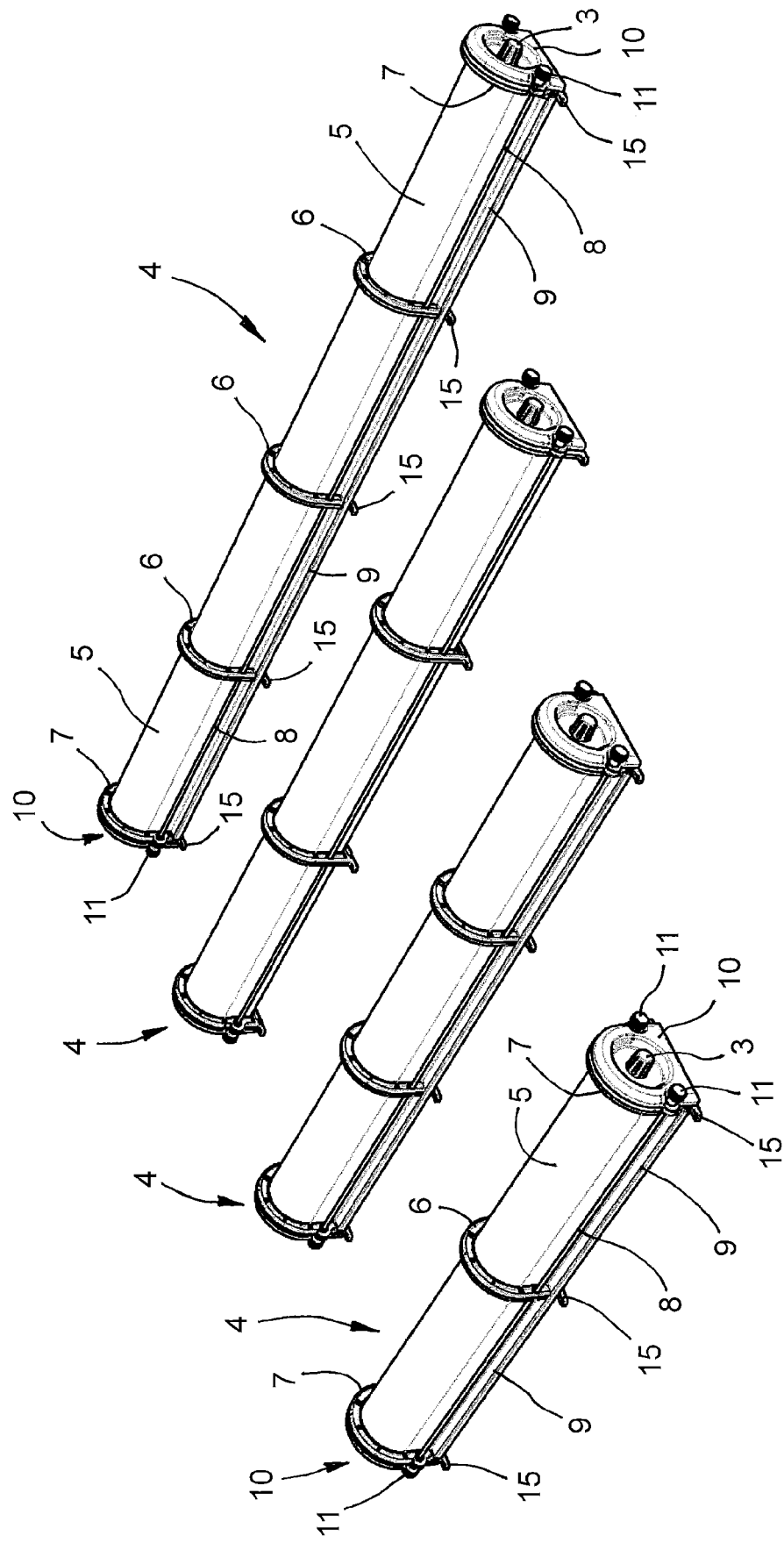
FIG. 5 illustrates schematically a number of casings for roll filtering fabric, according to the invention, with different sizes of the front of the filtering fabric roll.
Figure 6:
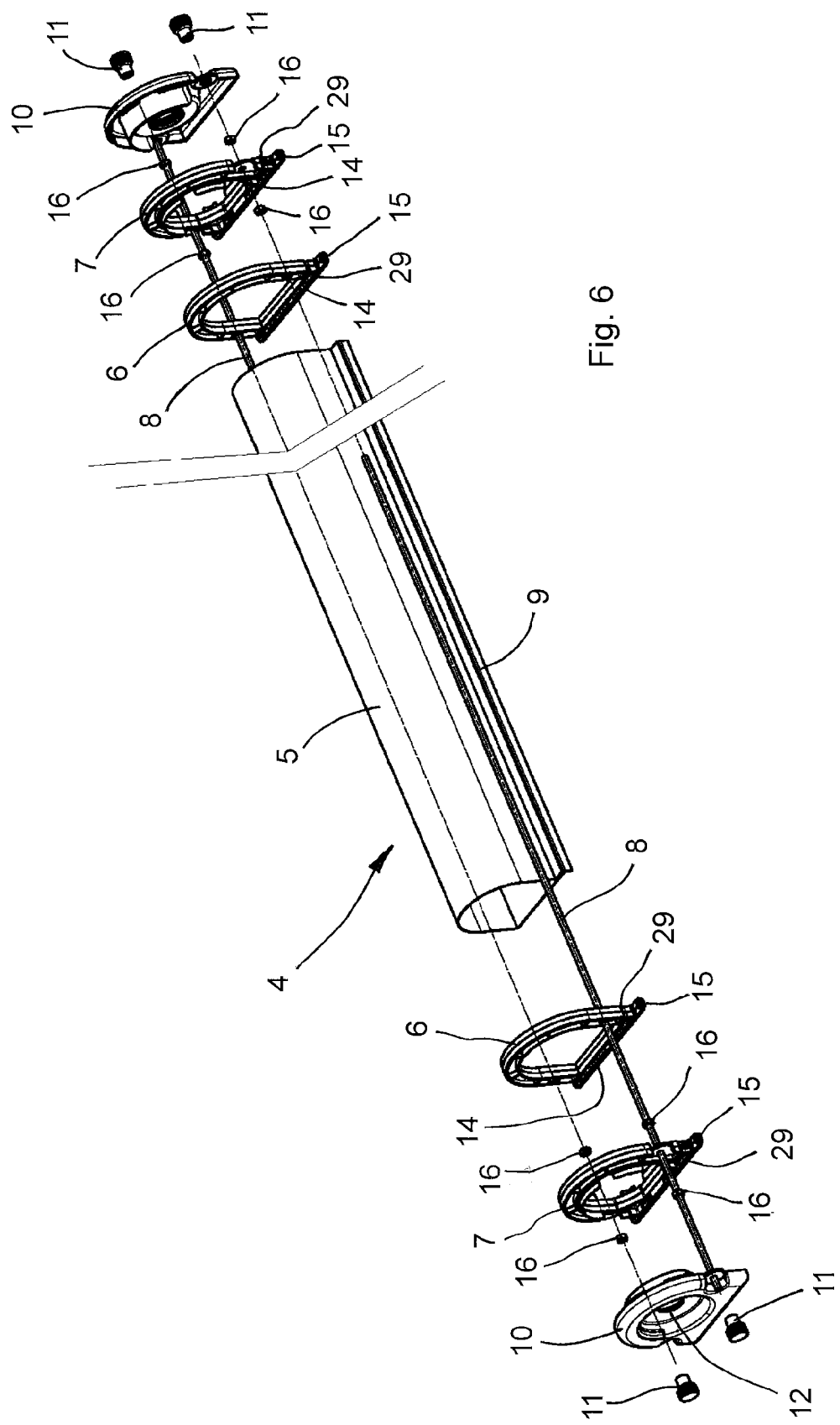
FIG. 6 illustrates a schematic perspective view of the components of the casing for the filtering fabric roll according to the invention, herein limited in length, but including all the parts composing it.
Figure 15:
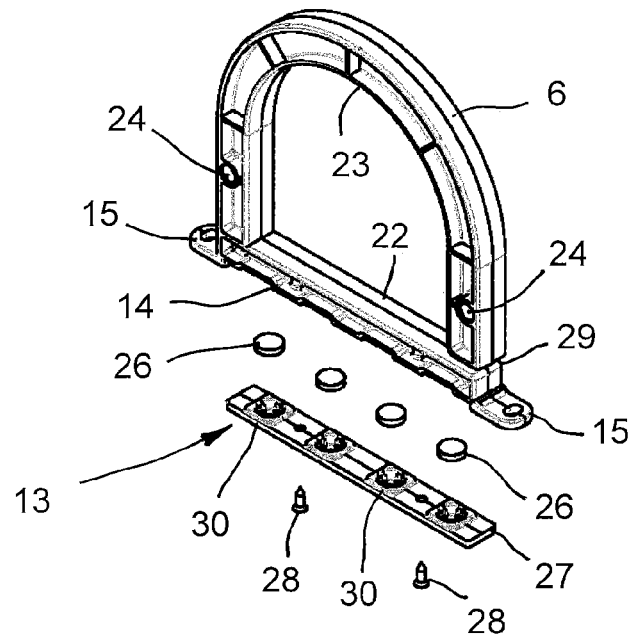
FIG. 15 shows a schematic perspective view of an intermediate support of the casing for roll filtering fabric in the preceding Figures, herein depicted as exploded in its component parts.
Figure 17:
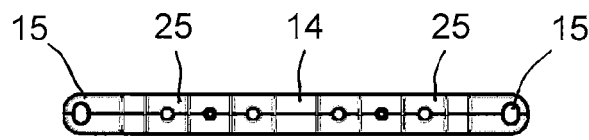
FIG. 17 shows a schematic view from below the body of the intermediate support of FIG. 16.
Figure 16:
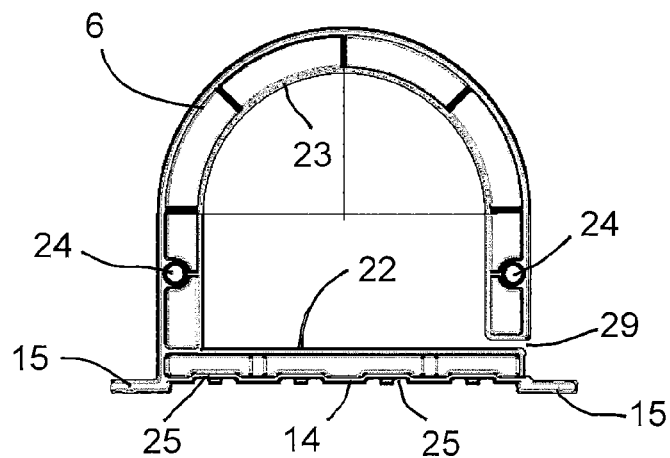
FIG. 16 illustrates a schematic side view of the body of the intermediate support in FIG. 15.
Figure 18:
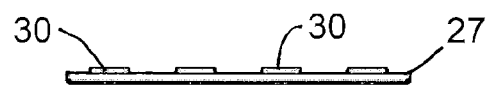
FIG. 18 illustrates a schematic side view of the cover for attaching permanent magnets to the body of the intermediate support in FIG. 15.
Figure 19:
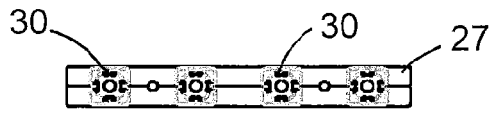
FIG. 19 illustrates a schematic plan view of the cover for permanent magnets in FIG. 18.
Figure 20:
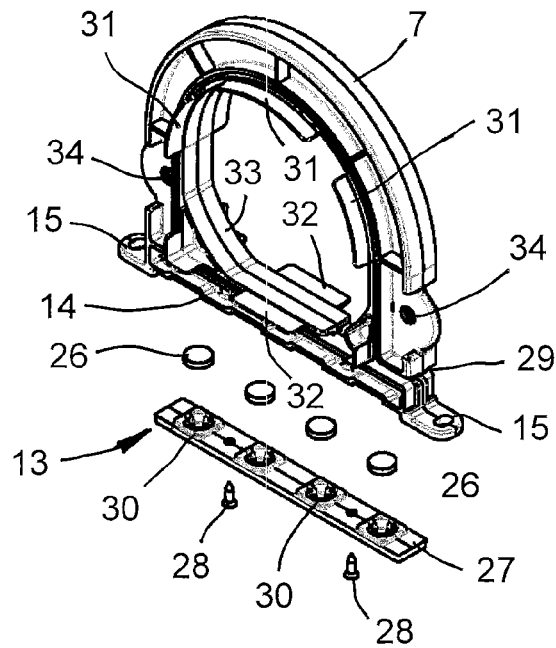
FIG. 20 shows a schematic perspective view of an end support of the casing for roll filtering fabric in the preceding Figures, herein depicted as exploded in its component parts.
Figure 22:
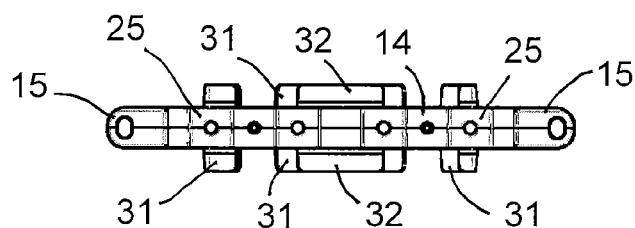
FIG. 22 shows a schematic view from below the body of the end support in FIG. 21.
Figure 21:
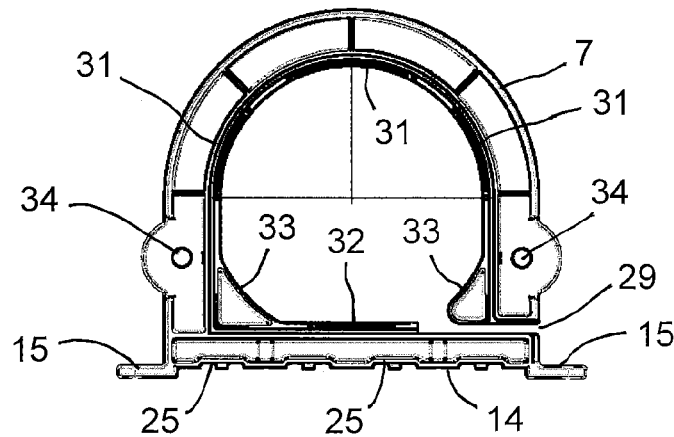
FIG. 21 illustrates a schematic side view of the body of the end support in FIG. 20.
Figure 23:
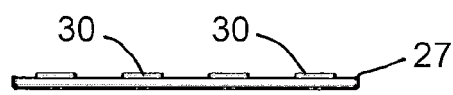
FIGS. 23 and 24 illustrate schematic side and plan views of the cover for attaching permanent magnets to the body of the end support in FIG. 20, identically to FIGS. 18 and 19.
Figure 24:
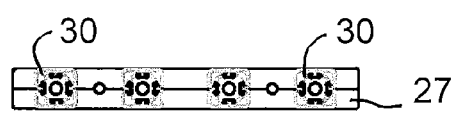
Figure 25:
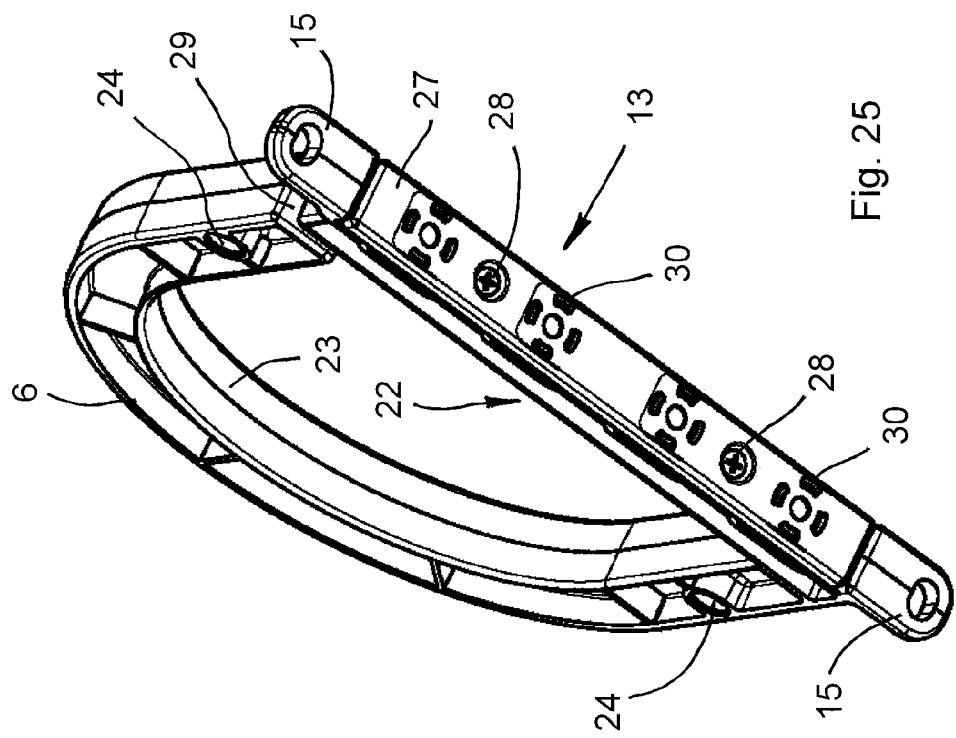
FIG. 25 shows a schematic perspective view of the intermediate support of the casing for roll filtering fabric in the preceding Figures, herein mounted and seen from below, i.e., from the face intended to be attached to the wall of the container with the port taking in the air.
Figure 26:
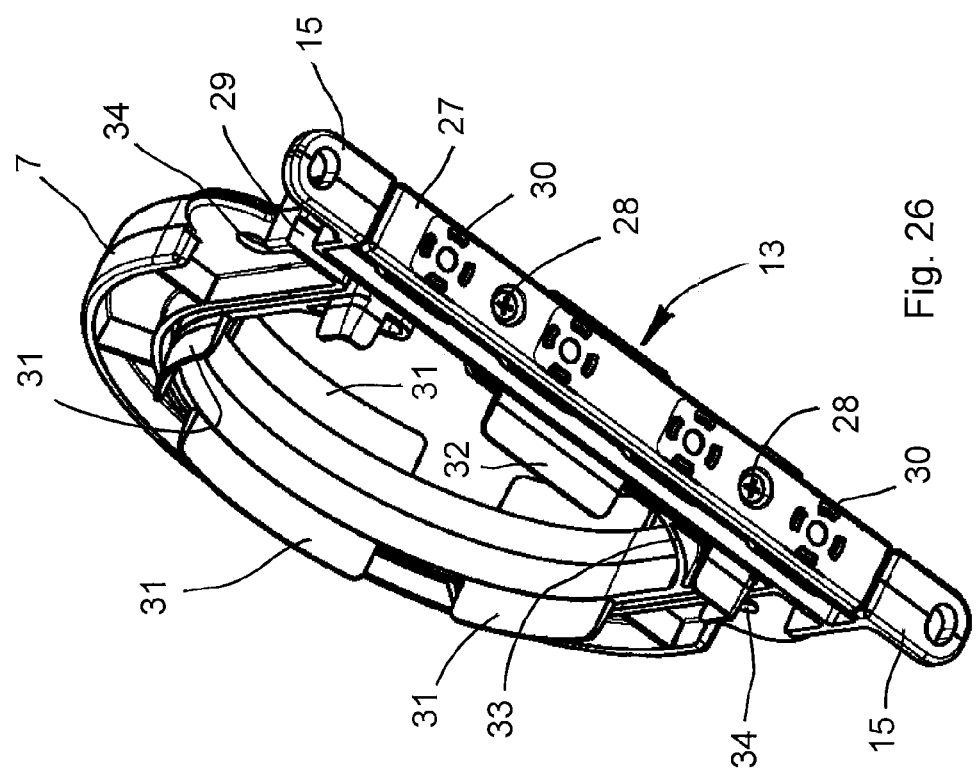
FIG. 26 shows a schematic perspective view of the end support of the casing for roll filtering fabric, herein mounted and seen from below similarly to the preceding Figure.

FIG. 5 shows the modularity applied to the described conformation of the modular filter according to the invention wherein the casing 4, with the shaped part 5 folded into an arch, allows to form a roll 1 for filtering fabric T with the desired length of the front F of the filtering fabric. The combination of the described elements, constituting each size of the casing 4, varies as a function of the length of the front F only in the length of the shaped wall 5 and of the number of intermediate supports 6, which in FIG. 5 ranges from one to three, but for short embodiments may not be provided, or may be even greater for embodiments with a very long front F of the filtering fabric.

FIGS. 6 to 9 show the combination of the described component parts and the mounting of the stay rods 8 on which double tightening nuts 16 are arranged, to make the mutual position of the end supports 7 stable so as to properly contain the arch-shaped wall 5; the double nuts 16 are tightened one to another on each end support 7, to fix their position on the pair of stay rods 8 which define the arch-shaped wall 5 as the main component of the casing 4 of the described modular filter. The possible intermediate support 6 is not fixedly positioned in the assembling performed, being able to be placed in the most convenient point for the user in mounting the modular filter for the desired application; likewise, the single intermediate support, two, three or possibly more intermediate supports 6 which are provided in the modular filter embodied as in FIG. 5 are positioned as desired.

FIGS. 10 to 14 show the conformation and the order of the steps of making the arch-shaped wall 5 which is embodied by a sheet 17, advantageously made of a semi-rigid plastic material, by bending two end edges 18, on the ledge 19, and end edge 20 on the bent wall 21, so as to move the end edge 20 close to the final part of the ledge 19 leaving a longitudinal slot 9 between this end edge 20 and the ledge 19 for the passage of the filtering fabric T when mounted. The arch-shaped wall 5 has a length L slightly greater than the length of the front F of the filtering fabric T of the roll 1; in use, the filtering fabric is extracted from the casing 4 through the slot 9 by pulling it therethrough.

In FIGS. 15 to 19 and 25, the conformation and constitution of an intermediate support 6 and the parts embodying the anchoring means 13 are provided. The support has a planar portion 22 and an arched portion 23, to contain the arch-shaped wall 5 and the end edges of the ledge 18 and of the bent wall 21, so as to allow the housing of the ledge 19 and the edge ends 20 to form the slot 9 when the support is mounted on the shaped wall 5 with a slot 29 of the support. The support has holes 24 for the pass-through housing of the stay rods 8; it also has seats 25 for inserting and positioning the permanent magnets 26 in the base of the support 14 which are stopped in this base with a base cover 27 and screws 28. The base cover has housings 30 for the permanent magnets with snap-on projections to hold the magnet in the respective housing 30.

In FIGS. 20 to 24 and 26, the conformation and constitution of an end support 7 and the parts embodying the anchoring means 13 are provided. The parts identical to the intermediate support 6 are identically numbered. The end support has arched lips 31 towards the two sides of the support to contain the shaped wall 5 and, on the opposite face, for coupling with the end cover 10. At the ledge 19 of the shaped wall 5, there are planar lips 32, finally, the inner wall of the end support 7 has arched pilot holes 33 where the filtering fabric T may rest when unwound from the roll 1. The end support has holes 34 for attaching the stay rods 8 when mounted with the nuts 16 tightened on this support on both sides of the end support 7 and for positioning it fixedly with respect to the shaped wall 5 at both ends thereof.

Figure 28:
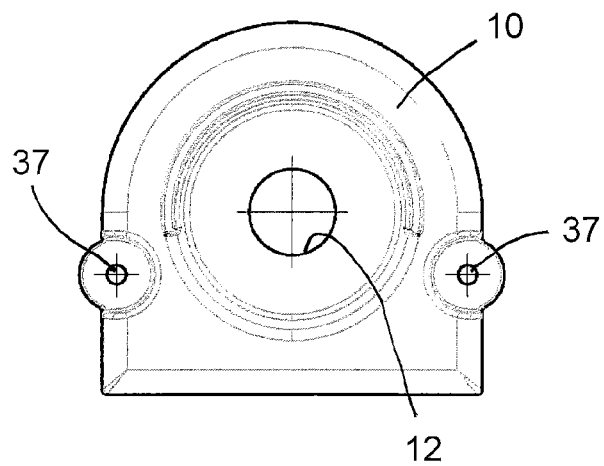
FIG. 28 shows a schematic side view of the end cover in FIG. 27.
Figure 29:
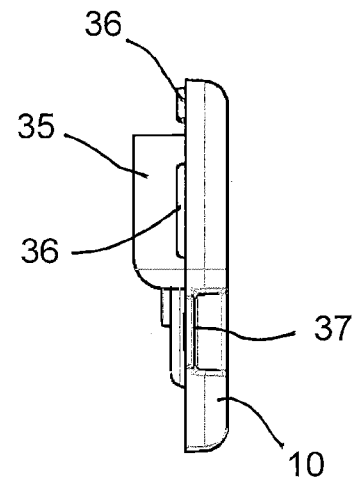
FIG. 29 shows a schematic front view of the end cover in FIG. 27, as seen when mounted in the casing in the preceding Figures.
Figure 30:
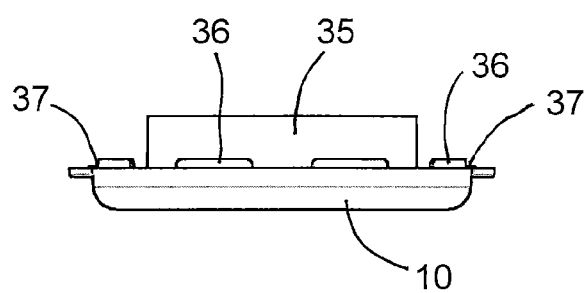
FIG. 30 shows a schematic top view of the end cover in FIG. 27.
Figure 27:
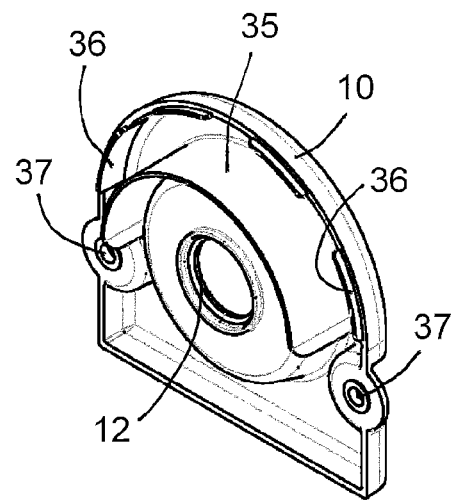
FIG. 27 shows a schematic perspective view of the end cover of the casing for roll filtering fabric.
Figure 31:
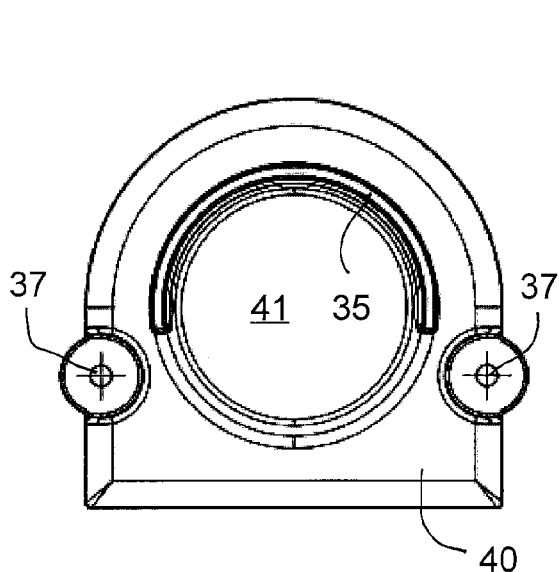
FIG. 31 shows a schematic side view of an end cover as FIG. 27, herein without a hole for the pin of the roll for manually operating the filtering fabric roll to constitute a simplified constructive variant.
Figure 32:
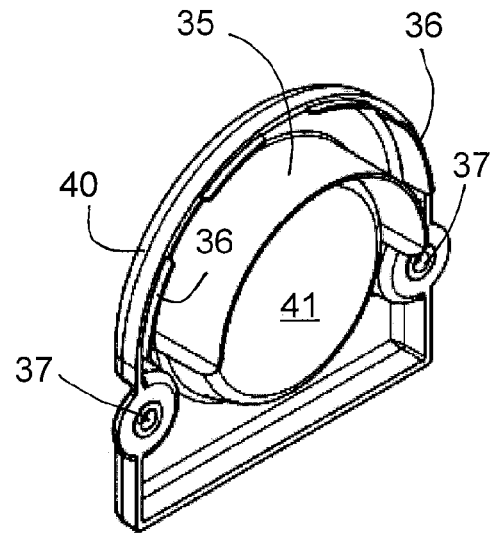
FIG. 32 shows a schematic perspective view of the end cover of the casing for roll filtering fabric in the preceding Figure.
Figure 33:
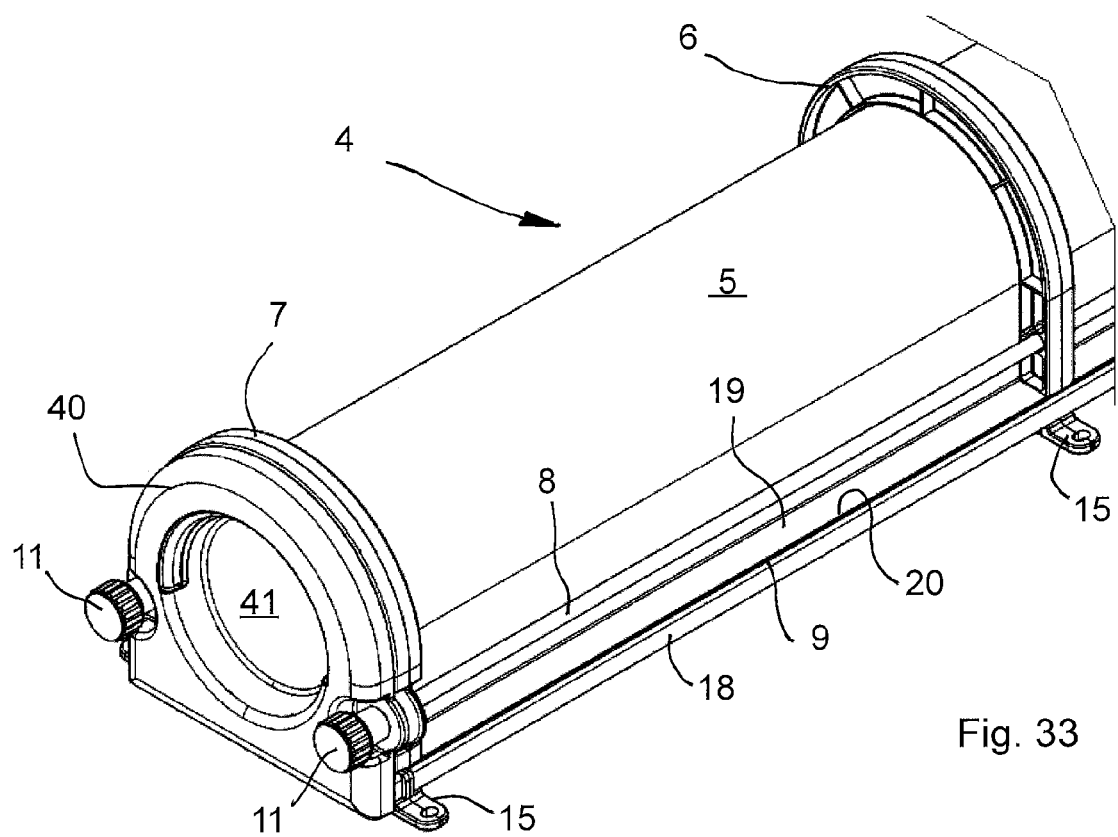
FIG. 33 shows a schematic perspective view of a casing for filtering fabric roll, by the way limited to only one side thereof, similar to FIG. 2, herein provided with the end cover in FIGS. 31 and 32.
Figure 34:
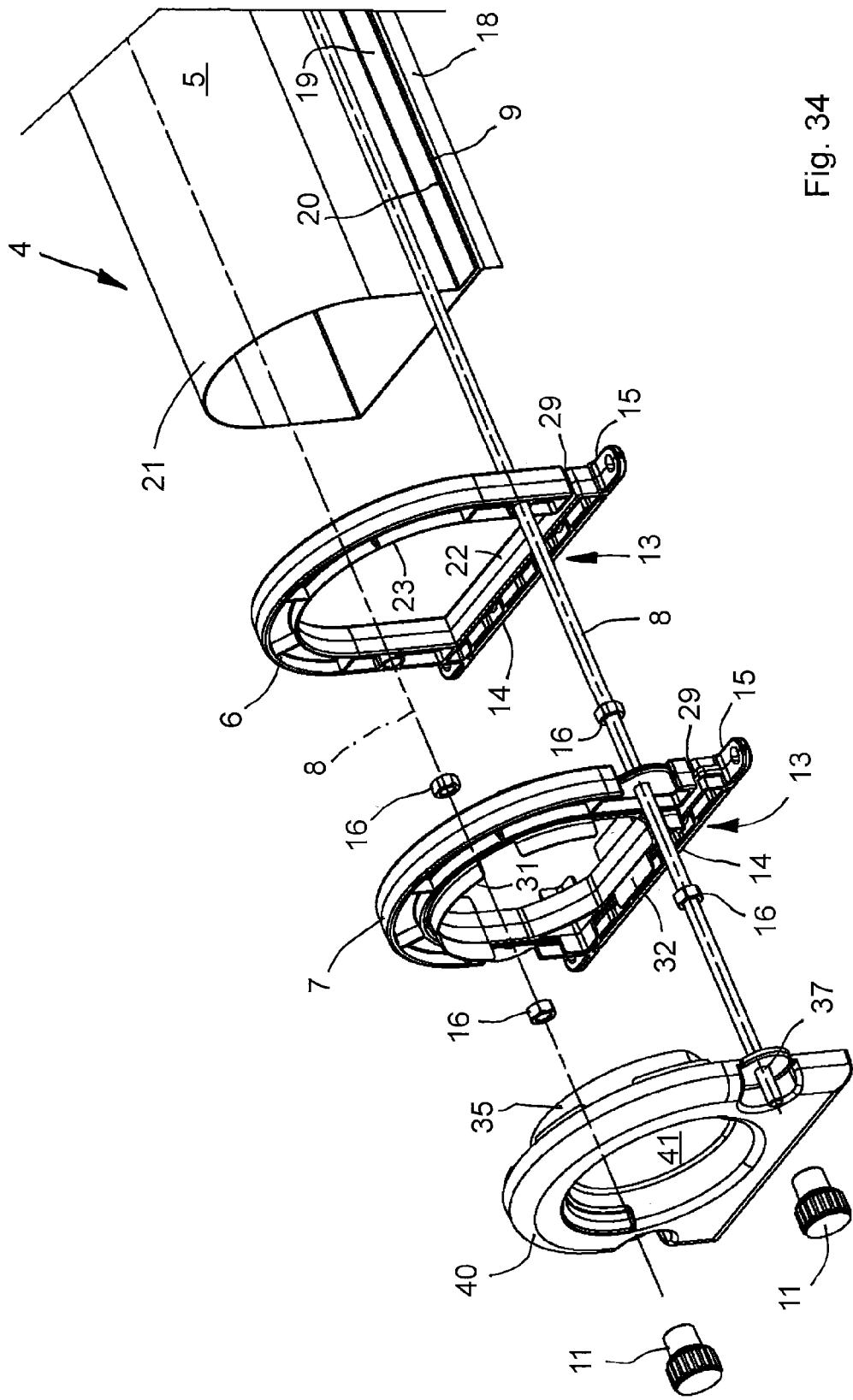
FIG. 34 shows a schematic perspective view of a casing for filtering fabric roll, by the way limited to only one side thereof, similar to FIG. 6, herein provided with the end cover in FIGS. 31 and 32, according to the invention, and of the components of the casing including all the parts composing it.

FIGS. 28 to 30 show the conformation of the end cover 10 wherein an arched lip 35 for guiding the roll 1 and short lips 36 to be coupled with the corresponding end support 7 to close the casing 4 of the modular filter according to the invention are provided. On the end cover 10, holes 37 for housing the stay rods 8 and attaching this cover to the corresponding end support 7 by means of the knobs 11 screwed onto the stay rods themselves are formed.

Figure 35:
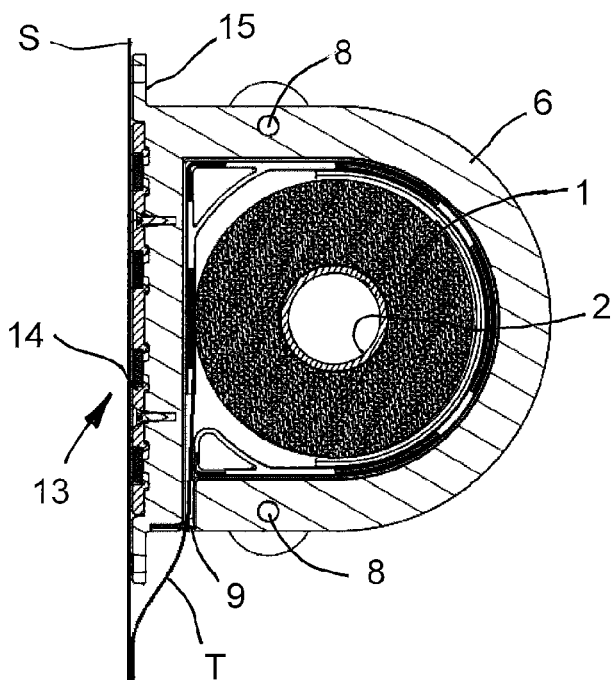
FIGS. 35 and 36 show a schematic section made on an intermediate support of the casing, similarly to FIG. 4 above, wherein the position of the filtering fabric roll inside the casing can be seen at the beginning of the use and after the consumption of filtering fabric, extracted from the modular filter for ventilation air vents, in this constructive variant.
Figure 36:
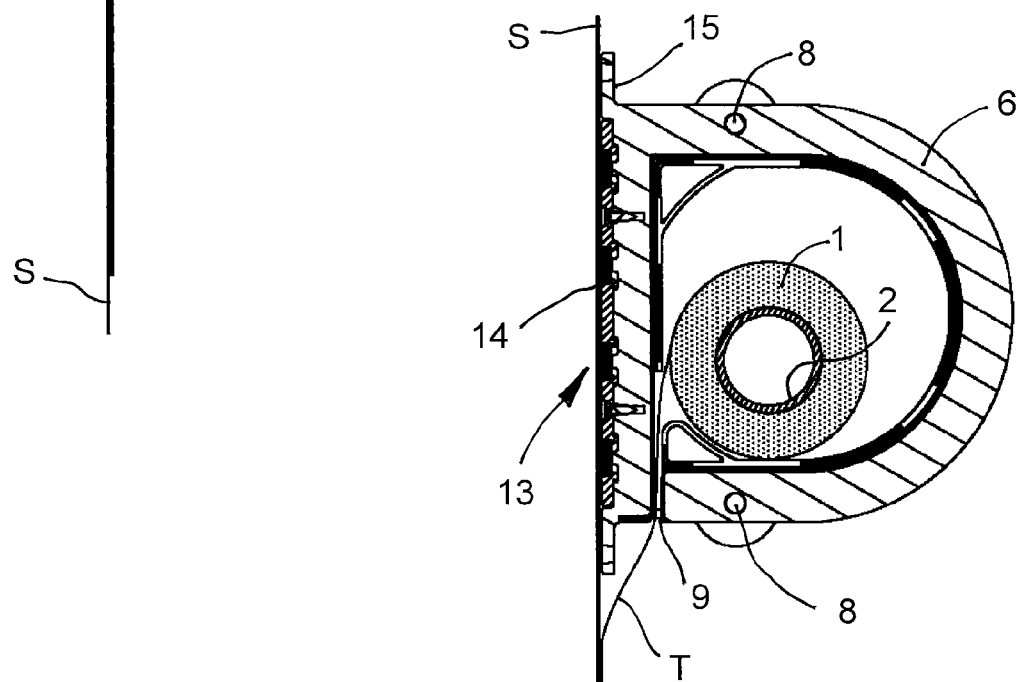
Figure 37:
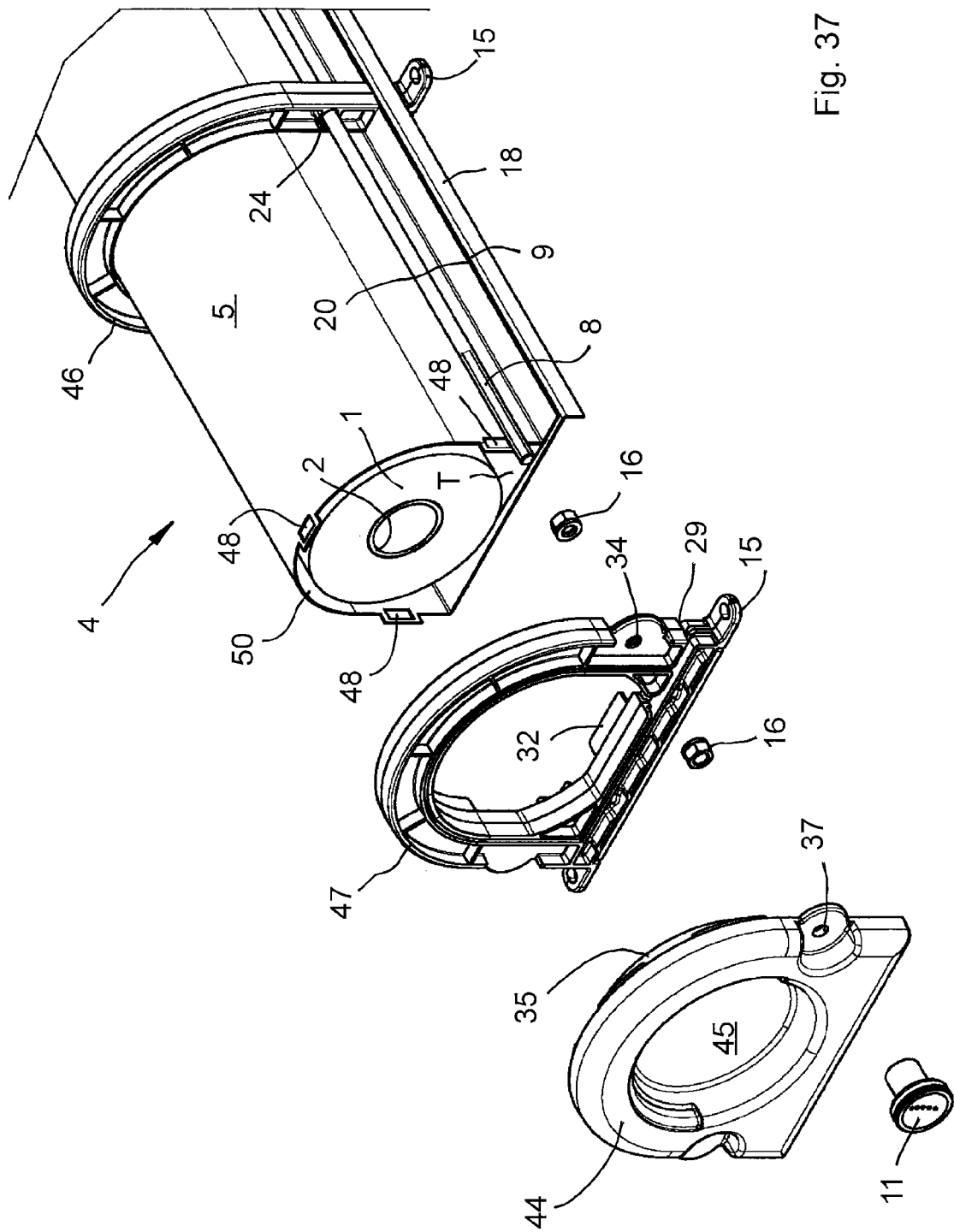
FIG. 37 shows a schematic perspective view of a casing for filtering fabric roll of a further variant, by the way limited to only one side thereof, similar to FIGS. 6 and 34, herein provided with an end cover similar to FIGS. 31 and 32, according to the invention, and made with a single stay rod closing the components of the casing which includes all the parts composing it.
Figure 38:
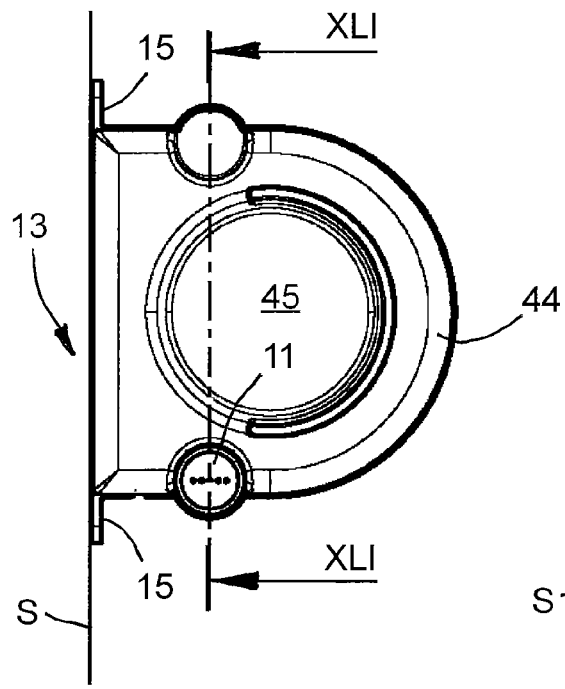
FIG. 38 is a schematic side view of a casing for roll filtering fabric, of the constructive form in FIG. 37 above, so as to show the end cover made without a central operating hole as shown in FIGS. 31 and 32.

FIGS. 31 to 36 show a further constructive form wherein the end covers 40 are closed, i.e., they have a closing wall 41 of the casing 4 without the pin hole 12, that is the filtering fabric roll 1 is housed freely within the casing, as can be seen from its position in FIGS. 35 and 36, when the filtering fabric roll is newly inserted, FIG. 35, and during the gradual extraction of the filtering fabric with the use of this filter, FIG. 36. The common parts already described are indicated with the same reference number.

Figure 39:
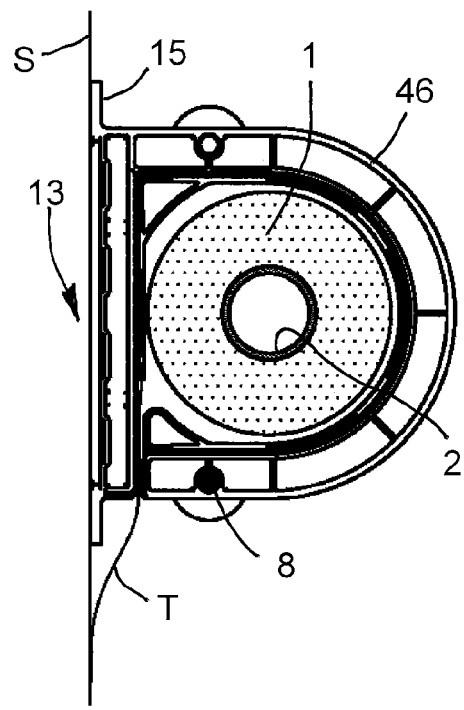
FIGS. 39 and 40 show a schematic section made on an intermediate support of the casing, similarly to FIG. 4 above, wherein the position of the filtering fabric roll inside the casing can be seen at the beginning of the use and after the consumption of filtering fabric, extracted from the modular filter for ventilation air vents, in this further constructive variant of FIG. 37.
Figure 40:
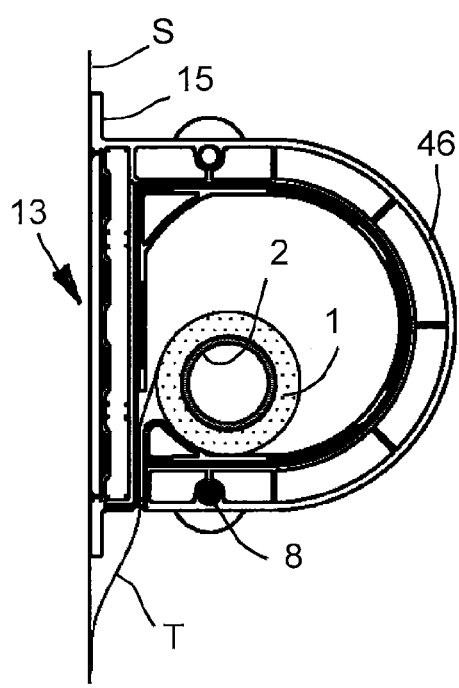
Figure 41:
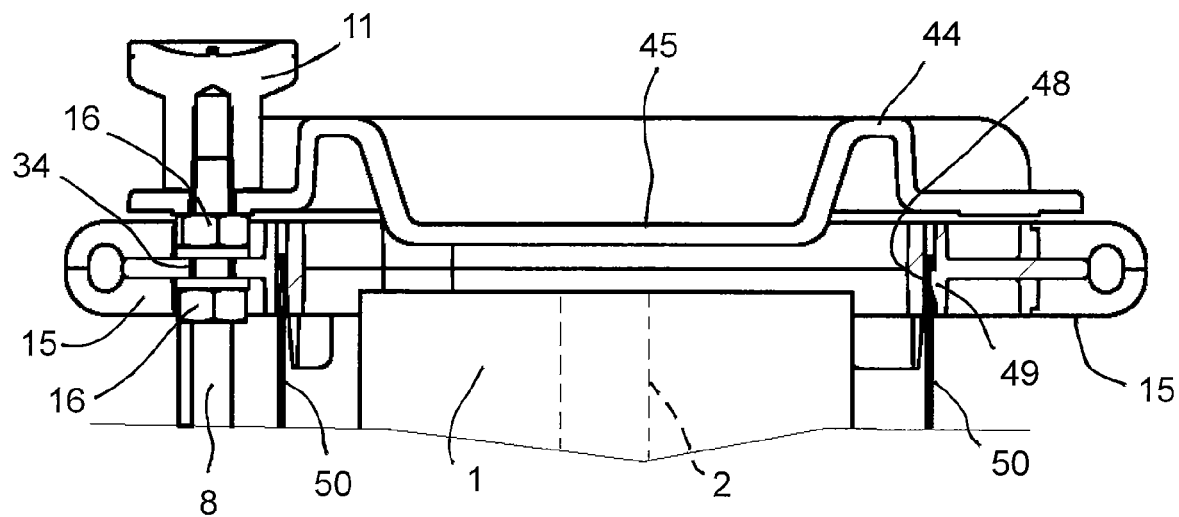
FIG. 41 is a schematic section XLI-XLI of FIG. 38, taken on the end support with the cover without an operating hole and suitable for showing the interlocking of the casing in the end support itself.
Figure 42:
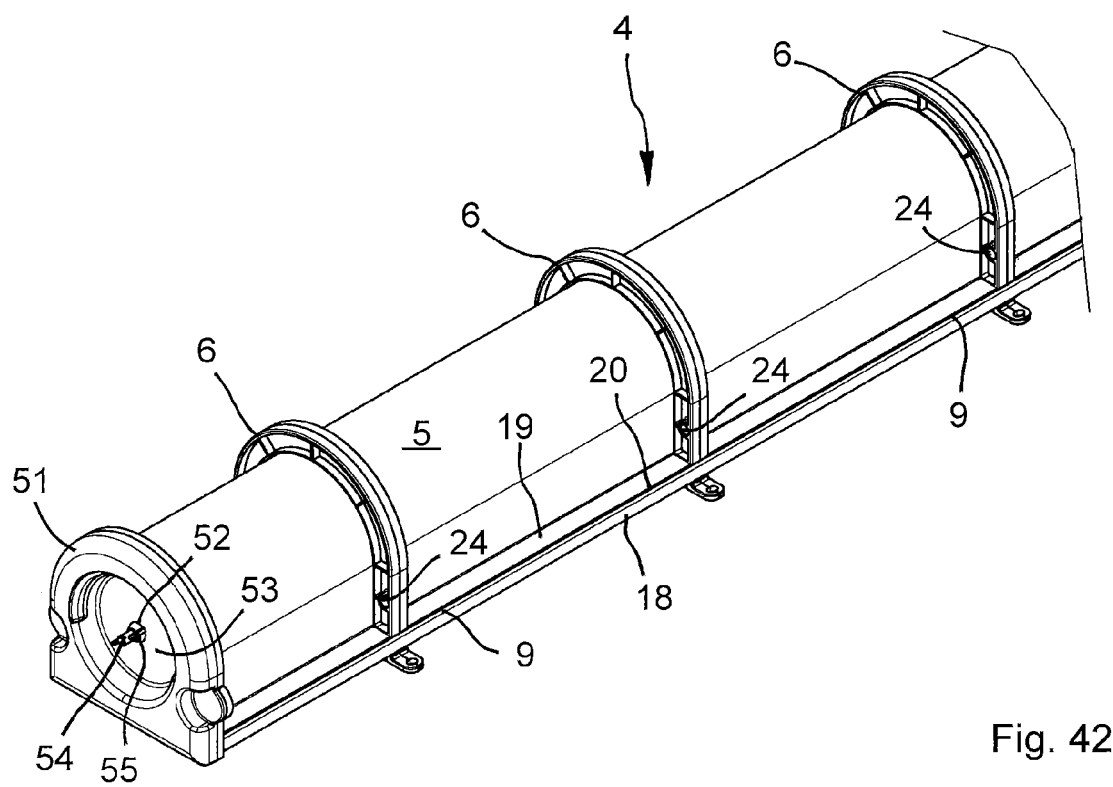
FIG. 42 shows a schematic perspective view of a casing for a filtering fabric roll, by the way limited to only one side thereof, similar to FIGS. 2 and 33, herein provided with an end cover, according to a simplified version of the invention, as well as embodied with a single stay rod closing the components of the casing which is placed in the axis of the cross-section of the casing and placed within the core of the filtering fabric roll contained and dispensed by the casing thereof.
Figure 43:
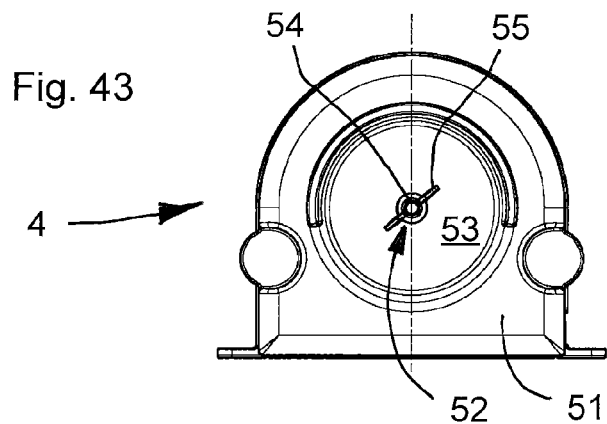
FIG. 43 shows a side view of a casing for a roll filtering fabric filter embodied in this simplified version of the invention.
Figure 44:
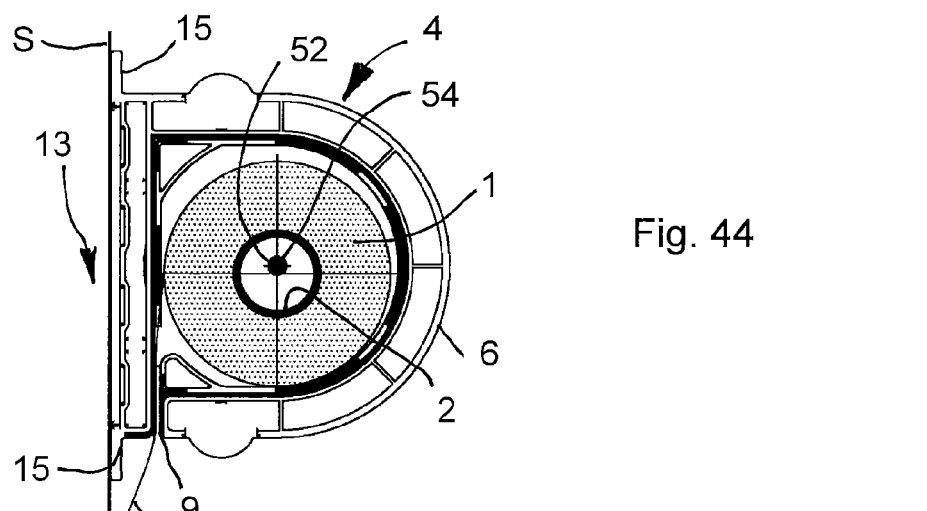
FIGS. 44 and 45 show a schematic section made on an intermediate support of the casing, similarly to FIGS. 39 and 40 above, wherein the position of the filtering fabric roll inside the casing can be seen at the beginning of the use and after the consumption of filtering fabric, extracted from the modular filter for ventilation air vents, in this simplified constructive variant of FIGS. 42 and 43.
Figure 45:
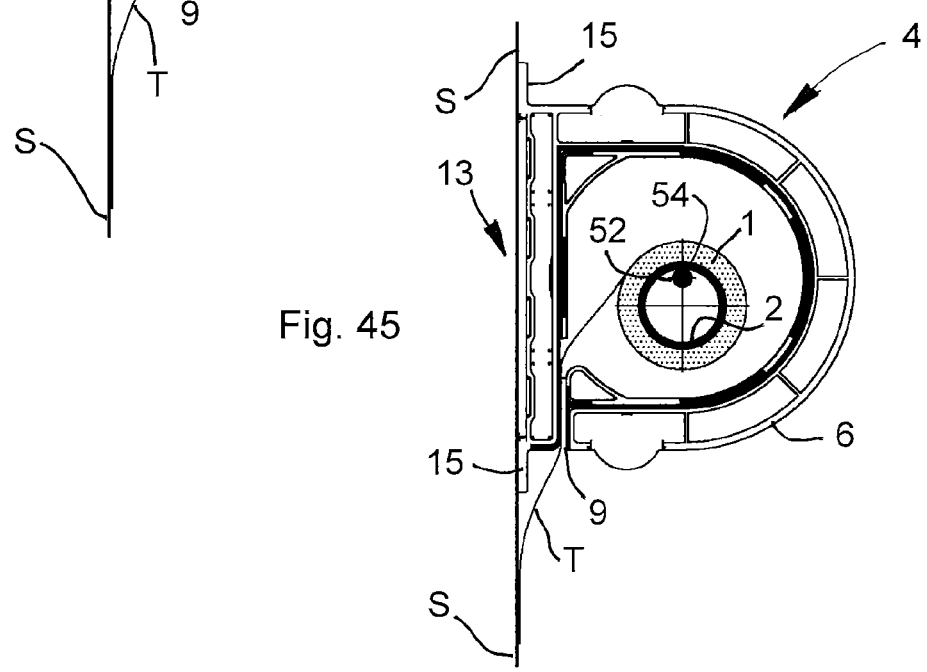

Further, FIGS. 37 to 41 show a further variant of a constructive form with a single stay rod 8, wherein between the closed end covers 44, i.e. having a closing wall 45 of the casing 4 without the pin hole 12, the filtering fabric roll is housed freely within the casing, as can be seen from its position in FIGS. 39 and 40, and as already shown in connection with FIGS. 35 and 36. The common parts already described are indicated with the same reference number. The intermediate support 46 has a single through hole 24 and, to ensure the tightening of the single stay rod on the perimeter of the end support 47, interlocks 48 are formed on the bent wall 21 of the arch-shaped wall 5 to facilitate the insertion of a notch 49 in contact with said end support 47, so the casing 4, although tightened between the two end supports 47, is also retained on the side opposite the stay rod 8 mounted between these supports.

FIGS. 42 to 45 show a further simplified constructive form of a casing 4 wherein intermediate supports 6 are positioned to wrap the arch-shaped wall 5 and to anchor the casing 4 of the filter as a whole to a wall S, as in the other constructive forms already described. The common parts already described are indicated with the same reference number. At each end, there is a closing cover 51, which is similar to the end covers 10 above with the end hole 12 and 44 with the closing wall 45; this closing cover has a single central hole 52 in the closed wall 53 in which a stay rod 54 which is tightened to keep the filter casing 4 closed is placed. The tightening of the stay rod can be carried out by a typical knob, not depicted, or by a wing nut 55 shown herein.

At the end of the arch-shaped wall 5, the closing cover 51 lacks anchoring means and, therefore, it may be freely removed and mounted to replace the roll 1 of filtering fabric T without modifying the attachment of the casing 4 onto the wall S to which it is applied. Furthermore, the filtering fabric roll is housed freely within the casing and constrained only by the presence of the stay rod 54, as can be seen from its position in FIGS. 44 and 45, and as already shown in connection with the preceding Figures. In the condition of a new filtering fabric roll, FIG. 44, the core 2 of the roll 1 does not touch the stay rod 54, positioned at the center of the closed wall 53, while with the roll 1 in the condition of use, FIG. 45, the core 2 rests on the stay rod 54 and suspends the roll within the casing 4.

The use of the modular filter for ventilation air vents occurs similarly to other casings with filter by resting the same on the surface S of the container provided with the air intake port to be filtered. The casing 4 remains applied to the ferromagnetic metal surface by the action of the magnets 26 which, being housed in the base cover 27, intermediate supports 6 or 46 and end supports 7 are positioned very close to the ferromagnetic metal surface. In the absence of the ferromagnetic surface, each intermediate or end support may be attached to the surface by means of typical screws in the flaps 15 they are provided with. The number of intermediate supports is proportional to the mass of the roll filtering fabric depending on the length, type and thickness of this filtering fabric T; that is, the intermediate supports, in addition to guiding the shaped wall 5, also support the mass of the filtering fabric. Each intermediate support 6 or 46 and end support 7 or 47, where present, is inserted in the coupling with the shaped wall 5 freely, i.e., with only the interlock or housing of the shaped wall 5, so as to make it slide over the length of the front F of the casing 4 and position the intermediate supports at the structure of the wall S on which the casing 4 with the roll filter is mounted.

By the way, the shaped wall 5 is embodied as in FIGS. 11, 12 and 13, and is bent only when it is mounted, since it is made of an adequately flexible sheet material, with the shape depicted in FIGS. 10 and 14; the intermediate and end supports keep it in an arched shape, thus forming the described casing 4. Furthermore, the shaped wall 5 may also be made of an extruded linear plastic material already with the final shape as in FIGS. 10 and 14, and cut to the length L required to form the wall shaped to contain the filtering fabric roll 1 having the front F. This embodiment allows to produce an extruded profile already shaped in an arched shape, such as the one depicted in FIG. 10, which requires only the cut to the desired length L for forming a casing 4 for a filtering fabric having a specific front F.

The constructive form with the variant of obtaining the shaped wall 5 by extrusion allows to keep in stock already shaped section bars which are only cut to the length required to satisfy the customer's needs, so as to make the production versatile and minimize costs, while achieving non-standard embodiments of the front F of the filtering fabric.

A possible variant, whether embodying the shaped wall by bending of a polycarbonate sheet or embodying it directly by extrusion, comprises the conformation of the wall having a square, a quadrilateral or a parallelogram section instead of an arched one. That is, the shaped wall depicted as arched is formed with right-angled walls and a square or parallelogram cross-section.

The advantages of the use of a modular filter for ventilation air vents as described are mainly due to their construction ease since it is possible to provide the intermediate 6 or 46 and end supports 7 or 47, as well as the covers 10, 40, 44 or 51 in large amounts. In fact, the latter are part of the casing 4, although do not necessarily depend on the length of the front F, as by the way present in the constructive forms known in the art, but the shaped wall 5 may be produced in the size L requested by the user, as can be seen in FIG. 5. Another significant advantage is the dimensional embodiment of the casing in relation to the specific filtering fabric to be used and to the length of the roll and the required thickness of this fabric.

Further, the ease of replacement of the roll 1 of filtering fabric T is maximum, simply by opening at least one of the end covers 10, 40, 44, or 51 and replacing the roll core 2, now lacking filtering fabric, with a new roll 1 and keeping the end of the front F of the filtering fabric T outside the casing 4 through the slot 9 of the arch-shaped wall 5. The casing 4, in all the various described constructive forms, remains firmly attached by means of its intermediate or end supports to the structure of the wall S to which it is attached.

Obviously, in order to meet specific and contingent needs, several modifications may be made by a person skilled in the art to a modular filter for ventilation air vents, as described above, all of which are by the way included within the scope of protection of the present invention as defined by the following claims. Thus, although less conveniently, the shaped wall may be formed without a ledge, i.e., with a completely arched, or even square or parallelogram, conformation, and provided with the end edges to define the passage slot for the filtering fabric. Furthermore, in the case of the single stay rod 8 placed laterally to the casing 4, the coupling between the end support 47 of the casing 4 can be formed without the notches 49 and the respective interlocks 48 at the end 50 of the shaped wall 5. Finally, the pins 3 may be used with a respective cover 10, provided with a pin hole 12 also in the constructive forms of FIGS. 33-34 and 37 for replacing the covers with a closing wall.

The invention claimed is:

1. A modular filter for ventilation air vents comprising a filtering fabric roll housed within a casing
    provided with anchoring means engaging a surface of a container which has an air intake port to be filtered; the casing has a longitudinal slot for extracting a filtering fabric from the filtering fabric roll; characterized in that:

the casing comprises shaped wall enclosed at its ends by respective end covers and/or end supports of the shaped wall having a shape corresponding to the shaped wall and wherein the longitudinal slot at a front edge of the shaped wall to allow for the extraction of a front of the filtering fabric unwound from the filtering fabric roll;

the anchoring means are mounted on two intermediate supports or on the end supports;

the intermediate supports and the end supports include a slot to allow the filtering fabric to pass through;

at least one screw stay rod is placed between the respective end covers or end supports of the shaped wall and is tightened to define the proper distance between two of the end supports or covers, by tightening the end supports or end covers to the shaped wall, one at each end, to close an access to the casing containing the filtering fabric roll such that the filtering fabric roll is floating and free to rotate when the filtering fabric is dragged from the outside of the modular filter.

2. The modular filter according to the claim 1, wherein the at least one screw stay rod comprises at least one pair of threaded stay rods and the filtering fabric roll is contained in the casing consisting of the shaped wall and two end covers or two end supports of the shaped wall.

3. The modular filter according to claim 1, wherein the shaped wall is arch-shaped to include the outer diameter of the roll of filtering fabric.

4. The modular filter according to claim 1, wherein at least one intermediate support of the shaped wall, housed between said two end supports, is provided to contain the casing.

5. The modular filter, according to claim 1, wherein the shaped wall is supported by the two intermediate supports, and wherein said shaped wall is closed by the end covers with a central stay rod of the at least one screw stay rod placed in a respective closing wall of the two end covers to close the casing.

6. The modular filter according to claim 1, wherein at least one of the end supports is coupled to one of the end covers which can be removed separately from the end support on a corresponding end of the casing to access the roll of filtering fabric and to replace it.

7. The modular filter according to claim 1, wherein the shaped wall is embodied by a sheet made of a plastic material bent along its length to form a ledge provided with an end edge, and a wall with an end edge of the wall being bent elastically during assembly to take the shape required for insertion in the end supports, the bent shape being in the form of an arch, a square, or a parallelogram.

8. The modular filter according to claim 1, wherein the shaped wall is formed by bending a sheet made of polycarbonate.

9. The modular filter according to claim 1, wherein the shaped wall is formed by extruding polycarbonate to provide the shape of the casing.

10. The modular filter, according to claim 1, wherein the respective end covers each have a closing wall.

11. The modular filter according to claim 1, wherein a single stay rod of the at least one screw stay rod is placed on the side of said longitudinal slot and is provided to tighten two of the end supports.

12. The modular filter according to claim 11, wherein the single stay rod is provided to tighten the end supports, and interlocks and corresponding notches are formed in a coupling of each of the end supports and a respective end of the shaped wall.

13. The modular filter according to claim 5, wherein a wing nut is inserted at the ends of the central stay rod to allow the attachment or detachment of the closing end cover(s) provided at the ends of the casing.

14. The modular filter according to claim 1, wherein the filtering fabric roll has at least one pin inserted in a core of the roll protruding from the at least one of the end covers for manually operating the rewinding the roll of filtering fabric.

15. The modular filter according to claim 1, wherein at least one knob is inserted at the end of the at least one screw stay rod to allow the attachment or detachment of one of the end supports and/or one of the end covers provided at one end of the casing.

* * * * *